(No Model.) 2 Sheets—Sheet 1.
J. W. WOODWARD.
ICE CREAM FREEZER.
No. 516,145. Patented Mar. 6, 1894.
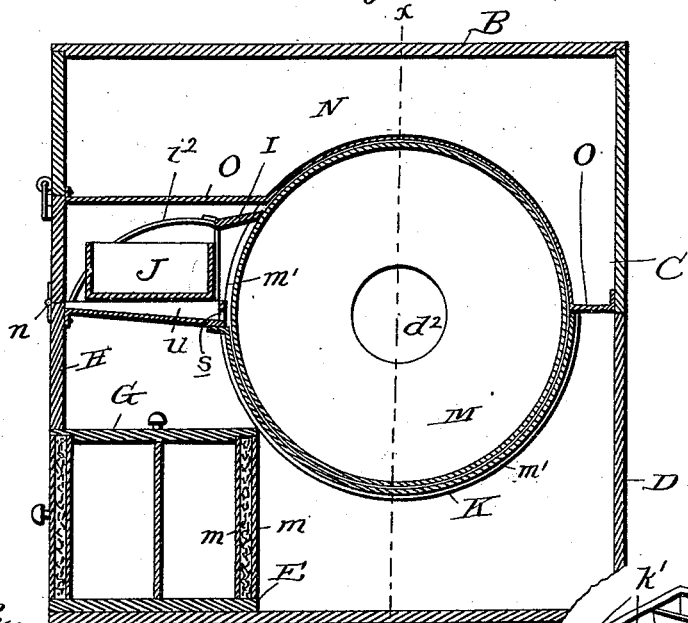
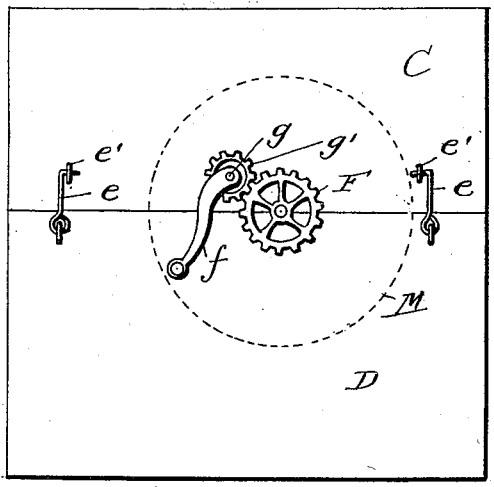
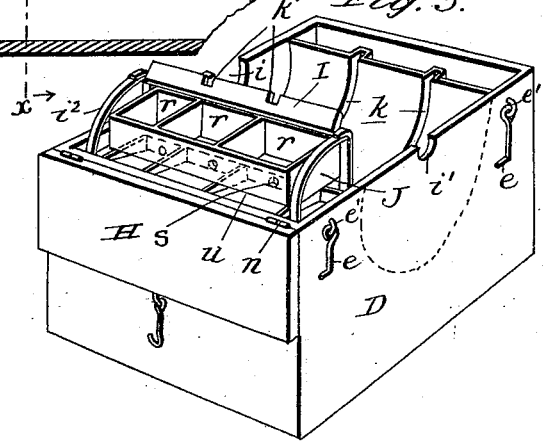
Witnesses:
C. H. Raeder
K. F. Matthews
Inventor
J. W. Woodward
By Jas. J. Sheehy
Attorney (No Model.) 2 Sheets—Sheet 2.
J. W. WOODWARD.
ICE CREAM FREEZER.
No. 516,145. Patented Mar. 6, 1894.
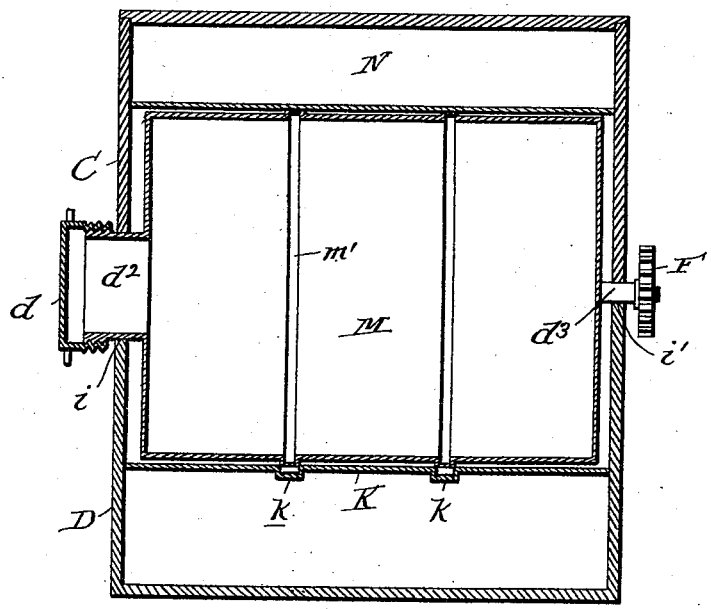
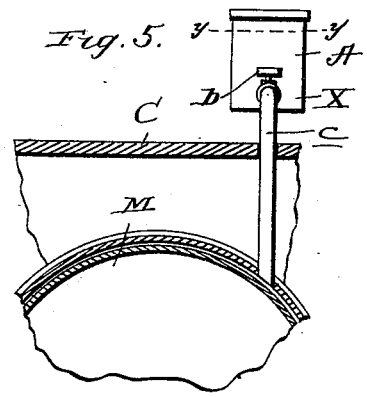
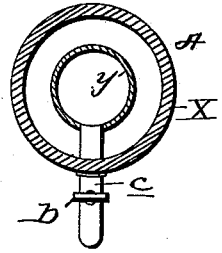

UNITED STATES PATENT OFFICE.

JAMES WILLIAM WOODWARD, OF VANDALIA, ILLINOIS.

ICE-CREAM FREEZER.

SPECIFICATION forming part of Letters Patent No. 516,145, dated March 6, 1894.

Application filed July 14, 1893. Serial No. 480,675. (No model.)

*To all whom it may concern:*

Be it known that I, JAMES WILLIAM WOODWARD, a citizen of the United States, residing at Vandalia, in the county of Fayette and State of Illinois, have invented a new and useful Improvement in Ice-Cream Freezers, of which the following is a specification.

My invention relates to improvements in that class of ice cream freezers, in which the cream is deposited in small quantities upon a freezing surface and is immediately congealed or frozen; and it has for its general object to provide such a freezer of a simple, compact, and efficient construction and one through the medium of which several different flavors of cream may be frozen at one and the same time without being mixed, and without the flavor of one being imparted to the other.

Other objects and advantages will be fully understood from the following description and claims when taken in connection with the accompanying drawings, in which—

Figure 1, is a longitudinal section of my improved freezer. Fig. 2, is a side elevation of the same. Fig. 3, is a perspective view of the lower section of the freezer casing. Fig. 4, is a transverse section taken in the plane indicated by the line $x, x$, of Fig. 1. Fig. 5, is a detail view of a modification, and Fig. 6, is an enlarged horizontal section taken in the plane indicated by the line $y, y$, of Fig. 5.

Referring by letter to said drawings:—D, indicates the lower and main section of the casing of my freezer.

C, indicates the upper section which is detachably connected to the section D, preferably by hooks and eyes $e, e'$, and B, indicates the top which may be detachably connected to the section C, in any approved manner. These several sections D, C, and B, are preferably formed from wood, and the main section D, is provided with a slidable drawer E, which is designed to receive the cream after it has been frozen and preserve it in a firm state for an indefinite period of time. The said drawer E, is provided with double walls $m$, to form a space to receive the ice or other freezing agent, and it is also provided with partition walls see Fig. 1 whereby the different flavors of cream may be kept separate, and with a top G, which is designed to prevent foreign matter from getting into the cream.

K, indicates a false bottom which is arranged in the lower casing section D, as shown. This false bottom K, is preferably formed from block tin and is of a semi-circular form as shown, and it is provided in its inner, upper side with two (more or less) longitudinal grooves $k$, which are designed to engage the peripheral ribs or tongues $m'$ of the freezing cylinder M, so as to prevent the several flavors of cream from being mixed, as presently described. The said cylinder M, is hollow to receive ice; and it is provided at one end with a tubular trunnion $d^2$, designed to be journaled in the bearing $i$, in the side walls of the sections C, D, and at its opposite end with a gudgeon $d^3$, which is designed to be journaled in the bearing $i'$, of the said sections. Ice is introduced into the cylinder M, through the trunnion $d^2$; and when the cylinder has been filled, it may be closed and hermetically sealed by the cap $d$, which is designed to be screwed upon the trunnion $d^2$, as better shown in Fig. 1.

The upper casing section C, is provided with a wall, which is designed to serve in conjunction with its side walls to form an ice receptacle N, above the cylinder M, and the said section C, is also provided with a short shaft $g$, which is provided with a pinion $g'$, designed to engage the gear wheel F, of the cylinder M, and with a crank $f$, through the medium of which the cylinder may be readily rotated.

In order to take the frozen cream in layers from the cylinder M, I provide the transverse blade I, which is supported in the casing by suitable spring arms as $i^2$, and is provided with notches $k'$, to receive the ribs or tongues $m$, of the cylinder M. This blade I, is pitched at such an angle in practice, that when it takes the cream off of the cylinder M, the cream will fall in layers into the receiving tray J, which is divided into a series of compartments $r$, as shown, to receive the different flavors of cream. The said tray or receptacle J, is designed to be removed through the open end of the casing section C, which is normally closed by the door H, connected to the section D, by hinges as $n$; and when so removed the contents of the said tray may be transferred to the compartments of the drawer E, after which the tray may be replaced to receive a fresh charge of cream.

$u$, indicates a series of receptacles or troughs for feeding cream to the several spaces of the cylinder M. These receptacles or troughs $u$, are arranged beneath the tray J, so that they may be conveniently charged by opening the door H, and they are provided in their inner walls with discharge apertures $s$, through which the cream passes to the spaces of the cylinder M. When a large quantity of ice cream is to be made, I contemplate employing a tank as A, in Figs. 5, and 6, in lieu of the receptacles $u$, which tank is designed to contain the prepared cream and feed the same to the cylinder M. This tank A, preferably comprises an outer casing X, of wood, and an inner lining of tin or zinc $y$, between which is formed a space designed to receive ice for the purpose of keeping the cream fresh and sweet, and the said tank is connected with the interior of the casing by the pipe $c$, which is provided with a valve $b$, and is designed to discharge the cream upon the cylinder M. When the freezer is to be used to make a number of different flavors of ice cream, a number of tanks A, corresponding to the number of spaces on the cylinder M, will be employed, but since the freezer may be employed to make a single flavor of cream, I have deemed it unnecessary to show more than one tank.

In the practical operation of the invention, the receptacle N, the space L, between the bottom K, and the casing D, and the drawer E, are charged with ice as is also the tank A, if the cream is to be fed by the same. The cylinder M, is then turned in the proper direction and the cream deposited upon the same from the receptacles $u$, or tanks A when it will be immediately congealed or frozen, after which it is automatically deposited in the tray J, in the manner described.

With my improved freezer a large quantity of ice cream may be made in a short time and may be preserved in a firm and solid state for an indefinite period of time by the same ice that is used to freeze it.

It will be noted from the foregoing description taken in conjunction with the drawings that my improved freezer is very simple and compact; that it is easily operated; and that it may be manufactured at slight cost which is a desideratum.

I have specifically described the construction and relative arrangement of the several parts of my improved freezer in order to impart a full and clear understanding of the same, but I do not desire to be understood as confining myself to such specific construction and arrangement as such changes or modifications may be made in practice as fairly fall within the scope of the invention.

Having described my invention, what I claim is—

1. In an ice cream freezer, as described, the combination of the casing comprising the lower section D, having the hinged door H, at one end and the upper section C, having a portion of one of its end-walls removed to receive the door H, the curvilinear wall K, arranged in the section D, and having the longitudinal grooves $k$, the rotary freezing cylinder M, arranged above the wall K, and having the peripheral tongues or ribs $m'$, adapted to engage the grooves of said wall K, the receptacle J, arranged at one end of the casing adjacent to the door H, and having the compartments $r$, the transverse blade I, engaging the periphery of the cylinder and having notches for the passage of the ribs or tongues thereof; the said blade being adapted to take the frozen cream off the cylinder and deposit it in the compartments of the receptacle J, and the cream receptacles or troughs $u$, arranged beneath the receptacle J, and having apertures in their inner walls to permit the cream to pass to the cylinder, all as and for the purpose set forth.

2. The herein described ice cream freezer, consisting essentially of the casing comprising the lower section D, having the hinged door H, at one end, and the section C, having a portion of one of its end walls removed to receive the door H, and also having the removable top B, the curvilinear wall K, arranged in the section D, and having the longitudinal grooves $k$, the rotary freezing cylinder M, arranged above the wall K, and having the peripheral tongues or ribs $m'$, adapted to engage the grooves of said wall K, the curvilinear wall O, arranged in the casing section C, and serving in conjunction with said section to form an ice receptacle above the cylinder, the receptacle J, arranged at one end of the casing adjacent to the door H, and having the compartments $r$, the transverse blade I, engaging the periphery of the cylinder and having notches for the passage of the ribs or tongues thereof; the said blade being adapted to take the frozen cream off the cylinder and deposit it in the compartments of the receptacle J, the cream receptacles or troughs $u$, arranged beneath the receptacle J, and having apertures in their inner walls to permit the cream to pass to the cylinder, and the frozen cream preserving drawer E, arranged in the casing section D, all as and for the purpose set forth.

JAMES WILLIAM WOODWARD.

Witnesses:
G. C. STARK,
JNO. L. CURTIS.